US012749424B2

(12) United States Patent
Kim et al.

(10) Patent No.: US 12,749,424 B2
(45) Date of Patent: Sep. 29, 2026

(54) DISPLAY DEVICE FOR REDUCING POWER CONSUMPTION, AND METHOD FOR CONTROLLING SAME

(71) Applicant: SAMSUNG ELECTRONICS CO., LTD., Suwon-si (KR)

(72) Inventors: Jonghwan Kim, Suwon-si (KR); Seonseok Kim, Suwon-si (KR); Guiwon Seo, Suwon-si (KR); Chun Zhao, Suwon-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 0 days.

(21) Appl. No.: 19/005,481

(22) Filed: Dec. 30, 2024

(65) Prior Publication Data

US 2025/0148957 A1 May 8, 2025

Related U.S. Application Data

(63) Continuation of application No. PCT/KR2023/007129, filed on May 25, 2023.

(30) Foreign Application Priority Data

Jul. 18, 2022 (KR) ........................ 10-2022-0088564

(51) Int. Cl.
*G09G 3/20* (2006.01)
*G06T 5/92* (2024.01)

(52) U.S. Cl.
CPC ............. *G09G 3/2092* (2013.01); *G06T 5/92* (2024.01); *G09G 2320/066* (2013.01); *G09G 2330/021* (2013.01)

(58) Field of Classification Search
None
See application file for complete search history.

(56) References Cited

U.S. PATENT DOCUMENTS 8,373,726 B2 2/2013 Ozawa et al.
8,953,840 B2 2/2015 Nagaoka et al.
(Continued)

FOREIGN PATENT DOCUMENTS

JP 2017-32764 A 2/2017
JP 2021-175130 A 11/2021
(Continued)

OTHER PUBLICATIONS

International Search Report (PCT/ISA/210) issued on Sep. 11, 2023 by the International Searching Authority in International Patent Application No. PCT/KR2023/007129.
(Continued)

*Primary Examiner* — Ifedayo B Iluyomade
(74) *Attorney, Agent, or Firm* — Sughrue Mion, PLLC

(57) ABSTRACT

A display device including: a display; and at least one processor connected to the display and configured to control the display device, where the at least one processor is configured to: identify an input image as a plurality of areas, identify a type of each of the plurality of areas by identifying at least one of the plurality of areas as a focus area and by identifying other areas of the plurality of areas as a background area, obtain a global tone mapping curve (TMC) for the input image based on a pixel level reduction amount corresponding to a target power consumption reduction amount, allocate a power consumption reduction amount to each of the plurality of areas based on the type of each of the plurality of areas, obtain a local tone mapping curve for each of the plurality of areas.

15 Claims, 13 Drawing Sheets

(56) References Cited

U.S. PATENT DOCUMENTS

| | | | | |
|---|---|---|---|---|
| 10,360,847 | B2 | 7/2019 | Lee et al. | |
| 10,692,466 | B2 | 6/2020 | Lim et al. | |
| 11,081,041 | B2 | 8/2021 | Park et al. | |
| 11,322,116 | B2 | 5/2022 | Lim et al. | |
| 2016/0163248 | A1* | 6/2016 | Yang | G09G 5/003 345/690 |
| 2020/0082511 | A1 | 3/2020 | Leem et al. | |
| 2022/0318964 | A1 | 10/2022 | Kim et al. | |

FOREIGN PATENT DOCUMENTS

| | | | |
|---|---|---|---|
| KR | 10-1327835 | B1 | 11/2013 |
| KR | 10-2014-0135941 | A | 11/2014 |
| KR | 10-2003470 | B1 | 7/2019 |
| KR | 10-2020-0001709 | A | 1/2020 |
| KR | 10-2020-0022704 | A | 3/2020 |
| KR | 10-2317601 | B1 | 10/2021 |
| KR | 10-2021-0142755 | A | 11/2021 |
| KR | 10-2023-0116615 | A | 8/2023 |

OTHER PUBLICATIONS

Written Opinion (PCT/ISA/237) issued on Sep. 11, 2023 by the International Searching Authority in International Patent Application No. PCT/KR2023/007129.

Communication dated Dec. 19, 2025, issued by the Korean Ministry of Intellectual Property in Korean Patent Application No. 10-2022-0088564.

* cited by examiner

APL-PEAK Model

Input Image

Focus level map(Pixel)

Focus level map(Block)

APL-PEAK MODEL

DISPLAY DEVICE FOR REDUCING POWER CONSUMPTION, AND METHOD FOR CONTROLLING SAME

CROSS-REFERENCE TO RELATED APPLICATION(S)

This application is a continuation of International Application No. PCT/KR2023/007129, filed on May 25, 2023, in the Korean Intellectual Property Receiving Office, which is based on and claims priority to Korean Patent Application No. 10-2022-0088564, filed on Jul. 18, 2022, in the Korean Intellectual Property Office, the disclosures of which are incorporated by reference herein in their entireties.

BACKGROUND

1. Field

The present disclosure relates to a display device and a method for controlling the same, and more particularly, to a display device performing image processing to reduce power consumption, and a method for controlling the same.

2. Description of Related Art

With the development of electronic technology, electronic devices providing various functions are being developed. Recently, the self-luminous display industry is actively progressing in increasing the size of the screen. The demand for large screens is increasing not only in the home TV market but also in the outdoor industry/advertisement display (large format display (LFD) and LED signage) markets.

As the size of the screen increases, power consumption increases, which causes the problem of carbon emission. Recently, major countries are requiring companies to perform environmental, social and corporate governance (ESG) management and are establishing regulations on carbon emissions. In this situation, the display device also needs to use power efficiently.

BACKGROUND

Aspects will be set forth in part in the description which follows and, in part, will be apparent from the description, or may be learned by practice of the presented embodiments.

According to an aspect of the disclosure, a display device may include: a display; and at least one processor connected to the display and configured to control the display device, where the at least one processor is configured to: identify an input image as a plurality of areas, identify a type of each of the plurality of areas by identifying at least one of the plurality of areas as a focus area and by identifying other areas of the plurality of areas as a background area, obtain a global tone mapping curve (TMC) for the input image based on a pixel level reduction amount corresponding to a target power consumption reduction amount, allocate a power consumption reduction amount to each of the plurality of areas based on the type of each of the plurality of areas, obtain a local tone mapping curve for each of the plurality of areas based on the power consumption reduction amount allocated to each of the plurality of areas, and perform image processing on each of the plurality of areas using the global tone mapping curve and the local tone mapping curve corresponding to each of the plurality of areas.

The at least one processor may be further configured to: based on an average pixel level of the focus area being greater than or equal to an average pixel level of the background area, allocate a larger power consumption reduction amount to the background area among the plurality of areas than the focus area among the plurality of areas.

The at least one processor may be further configured to: based on an average pixel level of the focus area being less than an average pixel level of the background area, reduce a pixel level of at least one area among the background area corresponding to a grayscale value in a predetermined range, and not reduce a pixel level of other areas among the background area or reduce a reduction amount of the pixel level of the other areas, based on grayscale information of the focus area.

The at least one processor may be further configured to: based on an average pixel level of the input image being less than a predetermined first value or greater than or equal to a predetermined second value greater than the predetermined first value, allocate the power consumption reduction amount only to the background area among the plurality of areas, and based on the average pixel level of the input image being greater than or equal to the predetermined first value and less than the predetermined second value, allocate the power consumption reduction amount to each of the plurality of areas.

The at least one processor may be further configured to: based on a size of the focus area being less than a predetermined size, allocate a larger power consumption reduction amount to an area corresponding to an average pixel level that is less than a threshold value, than an area corresponding to an average pixel level that is greater than or equal to the threshold value.

The at least one processor may be further configured to: based on the plurality of areas included in the focus area being spaced apart from each other, allocate the power consumption reduction amount to each of the plurality of areas based on a relative position of the focus area in the input image.

The at least one processor may be further configured to allocate the power consumption reduction amount to each of the plurality of areas based on the type of each of the plurality of areas and histogram information of each of the plurality of areas.

The at least one processor may be further configured to obtain the global tone mapping curve based on the target power consumption reduction amount and a histogram of the input image.

The at least one processor may be further configured to identify the type of each of the plurality of areas based on at least one of: an edge included in the input image, a degree of blur of the input image, a saliency detection technique, or a gaze tracking of a user.

The at least one processor may be further configured to perform image processing on each of the plurality of areas using one of: a method for weighting the global tone mapping curve and the local tone mapping curve corresponding to each of the plurality of areas, a method for serially synthesizing the global tone mapping curve and the local tone mapping curve corresponding to each of the plurality of areas, or a method for serially synthesizing the global tone mapping curve and the local tone mapping curve corresponding to each of the plurality of areas.

According to an aspect of the disclosure, a method for controlling a display device may include: identifying an input image as a plurality of areas; identifying a type of each of the plurality of areas by identifying at least one of the plurality of areas as a focus area and by identifying other areas among the plurality of areas as a background area;

obtaining a global tone mapping curve (TMC) for the input image based on a pixel level reduction amount corresponding to a target power consumption reduction amount; allocating a power consumption reduction amount to each of the plurality of areas based on the type of each of the plurality of areas; obtaining a local tone mapping curve for each of the plurality of areas based on the power consumption reduction amount allocated to each of the plurality of areas; and performing image processing on each of the plurality of areas using the global tone mapping curve and the local tone mapping curve corresponding to each of the plurality of areas.

The allocating the power consumption reduction amount may include: based on an average pixel level of the focus area being greater than or equal to an average pixel level of the background area, allocating a larger power consumption reduction amount to the background area among the plurality of areas than the focus area among the plurality of areas.

The allocating the power consumption reduction amount may include: based on an average pixel level of the focus area being less than an average pixel level of the background area, according to grayscale information of the focus area, reduce a pixel level of at least one area among the background area corresponding to a grayscale value in a predetermined range, and not reduce a pixel level of other areas among the background area or reduce a reduction amount of the pixel level of the other areas among the background area.

The allocating the power consumption reduction amount may include: based on an average pixel level of the input image being less than a predetermined first value or greater than or equal to a predetermined second value greater than the predetermined first value, allocating the power consumption reduction amount only to the background area among the plurality of areas, and based on the average pixel level of the input image being greater than or equal to the predetermined first value and less than the predetermined second value, allocating the power consumption reduction amount to each of the plurality of areas.

The allocating the power consumption reduction amount may include: based on a size of the focus area being less than a predetermined size, a larger power consumption reduction amount is allocated to an area corresponding to average pixel level that is less than a threshold value than an area corresponding to an average pixel level that is greater than or equal to the threshold value.

BRIEF DESCRIPTION OF DRAWINGS

The above and other aspects, features, and advantages of certain embodiments of the present disclosure will be more apparent from the following description taken in conjunction with the accompanying drawings, in which.

DETAILED DESCRIPTION

An object of the present disclosure is to provide a display device capable of preventing image quality from deteriorating by increasing a visual contrast ratio of a focus area (area of interest) of an input image while reducing power consumption, and a method for controlling the same.

Hereinafter, the disclosure will be described in detail with reference to the accompanying drawings.

General terms that are currently widely used were selected as terms used in embodiments of the disclosure in consideration of functions in the disclosure, but may be changed according to the intention of those skilled in the art or a judicial precedent, the emergence of a new technique, and the like. In addition, in a specific case, terms arbitrarily chosen by an applicant may exist. In this case, the meaning of such terms will be mentioned in detail in a corresponding description portion of the disclosure. Therefore, the terms used in embodiments of the disclosure are to be defined on the basis of the meaning of the terms and the contents throughout the disclosure rather than simple names of the terms.

In the specification, an expression “have”, “may have”, “include”, “may include”, “comprise”, “may comprise” or the like, indicates existence of a corresponding feature (e.g., a numerical value, a function, an operation, a component such as a part, or the like), and does not exclude existence of an additional feature.

An expression “at least one of A and/or B” is to be understood to represent “A” or “B” or “any one of A and B.”

Expressions “first,” “second,” “$1^{st}$” or “$2^{nd}$” or the like, used in the present disclosure may indicate various components regardless of a sequence and/or importance of the components, will be used only in order to distinguish one component from the other components, and do not limit the corresponding components.

Singular forms include plural forms unless the context clearly indicates otherwise. It should be understood that terms “comprise”, “include”, or “formed of” used in the specification specify the presence of features, numerals, steps, operations, components, parts, or combinations thereof mentioned in the specification, but do not preclude the presence or addition of one or more other features, numerals, steps, operations, components, parts, or combinations thereof.

In the disclosure, the term user may refer to a person using an electronic device or a device (for example, an artificial intelligence electronic device) using the electronic device.

Hereinafter, diverse embodiments of the disclosure will be described in more detail with reference to the accompanying drawings.

Figure 1:
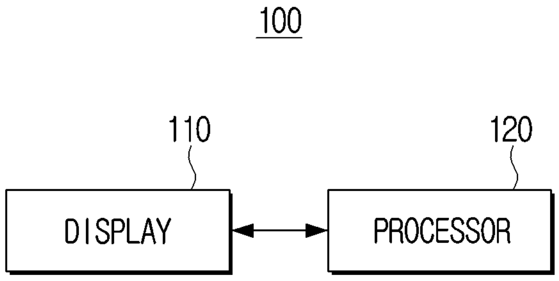
FIG. 1 is a block diagram illustrating a configuration of a display device according to an embodiment of the present disclosure.

FIG. 1 is a block diagram illustrating a configuration of a display device according to an embodiment of the present disclosure.

A display device 100 is a device that displays an input image, and may be a TV, a desktop PC, a laptop, a video wall, a large format display (LFD), a digital signage, a digital information display (DID), a projector display, a digital video disk (DVD) player, a refrigerator, a washing machine, a smartphone, a tablet PC, a monitor, smart glasses, a smart watch, etc., and any device that may display an input image may be used.

However, the present disclosure is not limited thereto, and the display device 100 may be implemented as an electronic device that does not include a display. In this case, the electronic device may perform image processing on the input image based on information of a device including a display, and provide the image-processed input image to the device including the display.

The display device 100 may reduce a pixel level of the display by lowering power of a driving unit that drives the signal of the input image or the display, and may reduce power consumption accordingly. In this process, the display device 100 may perform image processing on a focus area and a background area of the input image differently, thereby reducing power consumption while minimizing deterioration in image quality. For example, the display device 100 may reduce the pixel level of the background area that is relatively insensitive to perceived brightness reduction to lower the power consumption and improve a pixel level contrast between the focus area and the background area to improve the perceived brightness contrast.

The display device 100 may be a device including a self-luminous display. However, the present disclosure is not limited thereto, and the display device 100 may be implemented in any manner as long as it is a device to which the present disclosure may be applied.

Referring to FIG. 1, the display device 100 includes a display 110 and a processor 120.

The display 110 is a configuration that displays an image, and may be implemented as various types of displays such as a liquid crystal display (LCD), an organic light emitting diode (OLED) display, a plasma display panel (PDP), and the like. A driving circuit, a backlight unit, and the like, that may be implemented in the form such as an a-si thin film transistor (TFT), a low temperature poly silicon (LTPS), a TFT, an organic TFT (OTFT), and the like, may be included in the display 110. Meanwhile, the display 110 may be implemented as a touch screen combined with a touch sensor, a flexible display, a three-dimensional (3D) display, or the like.

The processor 120 controls a general operation of the display apparatus 100. Specifically, the processor 120 may be connected to each component of the display device 100 to generally control an operation of the display device 100. For example, the processor 120 may be connected to components such as the display 110, a memory, and a communication interface to control the operation of the display device 100.

According to an embodiment, the processor 120 may be implemented as a digital signal processor (DSP), a microprocessor, or a time controller (TCON). However, the processor 120 is not limited thereto, and may include one or more of a central processing unit (CPU), a micro controller unit (MCU), a micro processing unit (MPU), a controller, an application processor (AP), a communication processor (CP), and an ARM processor, or may be defined by these terms. In addition, the processor 120 may be implemented as a system-on-chip (SoC) or a large scale integration (LSI) in which a processing algorithm is embedded, or may be implemented in a field programmable gate array (FPGA) form.

The processor 120 may be implemented as one processor or as a plurality of processors. However, for convenience of description, the operation of the display device 100 will be described below using the processor 120.

The processor 120 may identify an input image as a plurality of areas. For example, the processor 120 may identify each of the plurality of frames included in the input image as the plurality of areas of 6×6. Here, sizes of the plurality of areas may all be the same. However, the present disclosure is not limited thereto, and the plurality of areas may be divided into various numbers.

The processor 120 may identify at least one of the plurality of areas as the focus area and the remaining areas among the plurality of areas as the background area, thereby identifying the type of each of the plurality of areas.

For example, the processor 120 may identify the type of each of the plurality of areas based on at least one of an edge included in the input image, a degree of blur of the input image, a saliency detection technique, or a user's gaze tracking. For example, the processor 120 may detect the edge included in the input image and identify the focus area based on an edge surrounding a center of the input image. Alternatively, the display device 100 may further include a camera, and the processor 120 may identify the focus area by tracking the user's gaze through the camera.

However, the present disclosure is not limited thereto, and the processor 120 may identify the focus area and the background area from the input image in any number of ways. For example, the processor 120 may identify an object from an input image through an artificial intelligence model, and identify an area including the object as the focus area.

The processor 120 may obtain a global tone mapping curve (TMC) for the input image based on a pixel level reduction amount corresponding to a target power consumption reduction amount. Here, the global tone mapping curve is a curve for lowering each code value to a corresponding code value, and may be implemented in the form of a look-up table (LUT).

Alternatively, the processor 120 may obtain the global tone mapping curve based on the target power consumption reduction amount and the histogram of the input image. For example, when the input image includes only a code value greater than or equal to a threshold value, the processor 120 may obtain the global tone mapping curve for lowering only the code value greater than or equal to the threshold value.

The processor 120 may allocate a power consumption reduction amount to each of the plurality of areas based on the type of each of the plurality of areas.

For example, when an average pixel level of the focus area is greater than or equal to that the background area, the processor 120 may allocate a larger power consumption reduction amount to an area identified as the background area among the plurality of areas than an area identified as the focus area among the plurality of areas.

Alternatively, when the average pixel level of the focus area is less than that of the background area, the processor 120 may reduce a pixel level of grayscale values in a predetermined range among the background areas and not to reduce the pixel level of the remaining grayscale values among the background area or reduce the reduction amount of the pixel level of the remaining grayscale values, based on the grayscale information of the focus area.

Alternatively, when the average pixel level of the input image is less than a predetermined first value, or greater than or equal to a predetermined second value greater than the predetermined first value, the processor 120 may allocate the power consumption reduction amount only to the area identified as the background area among the plurality of areas, and when the average pixel level of the input image is greater than or equal to the predetermined first value and less than the predetermined second value, the processor may allocate the power consumption reduction amount to each of the plurality of areas.

Alternatively, when the size of the focus area is less than the predetermined size, the processor 120 may allocate the larger power consumption reduction amount to the area in which the average pixel level of each of the plurality of areas is less than a threshold value than the area in which the average pixel level of each of the plurality of areas is greater than or equal to a threshold value.

Alternatively, when the focus area includes the plurality of areas spaced apart from each other, the processor 120 may allocate the power consumption reduction amount to each of the plurality of areas based on the relative positions of the focus area in the input image.

Alternatively, the processor 120 may allocate the power consumption reduction amount to each of the plurality of areas based on the type of each of the plurality of areas and the histogram information of each of the plurality of areas.

The processor 120 may combine the above embodiments to allocate the power consumption reduction amount to each of the plurality of areas.

The processor 120 may obtain local tone mapping curves for each of the plurality of areas based on the power consumption reduction amount allocated to each of the plurality of areas. Alternatively, the processor 120 may obtain the local tone mapping curves based on the power consumption reduction amount allocated to each of the plurality of areas and the histogram of each of the plurality of areas. The method for obtaining a local tone mapping curve may be similar to the method for obtaining a global tone mapping curve.

The processor 120 may perform the image processing on each of the plurality of areas using the global tone mapping curve and the local tone mapping curves corresponding to each of the plurality of areas. For example, the processor 120 may perform the image processing on each of the plurality of areas using one of a method for weighting the global tone mapping curves and local tone mapping curves corresponding to each of the plurality of areas, a method for serially synthesizing the global tone mapping curves and local tone mapping curves corresponding to each of the plurality of areas, and a method for serially synthesizing the local tone mapping curves and the global tone mapping curves corresponding to each of the plurality of areas.

Alternatively, the processor 120 may obtain an artificial intelligence model by training the relationship between a plurality of sample input images and a plurality of sample output images obtained by performing the image processing on the plurality of sample input images using the above-described method, and input the input images to the artificial intelligence model to perform the image processing.

The artificial intelligence-related function according to the present disclosure may be operated through the processor 120 and the memory.

The processor 120 may be composed of one or more processors. In this case, one or more processors may be general-purpose processors such as a central processing unit (CPU), an application processor (AP), and a digital signal processor (DSP), graphics-dedicated processors such as a graphic processing unit (GPU) and a vision processing unit (VPU), or artificial intelligence-dedicated processors such as a neural processing unit (NPU).

One or a plurality of processors control to process input data according to a predefined operation rule or an artificial intelligence model stored in the memory. Alternatively, when one or more processors are the artificial intelligence-dedicated processors, the artificial intelligence-dedicated processors may be designed in a hardware structure specialized for processing a specific artificial intelligence model. The predefined operation rule or artificial intelligence model is created through training.

Here, the creation through the training means that a predefined operation rule or artificial intelligence model set to perform a desired characteristic (or purpose) is created by training a basic artificial intelligence model using a plurality of training data by a training algorithm. Such training may be performed in an apparatus itself on which the artificial intelligence according to the disclosure is performed or may be performed through a separate server and/or system. Examples of the training algorithm include supervised training, unsupervised training, semi-supervised training, or reinforcement training, but are not limited thereto.

The AI model may include a plurality of neural network layers. Each of the plurality of neural network layers has a plurality of weight values, and performs a neural network operation through an operation between an operation result of the previous layer and the plurality of weight values. The plurality of weight values of the plurality of neural network layers may be optimized by a training result of the artificial intelligence model. For example, the plurality of weights may be updated so that a loss value or a cost value obtained from the artificial intelligence model during a training process is decreased or minimized.

The artificial neural network may include deep neural network (DNN), and examples of the artificial neural network may include a convolutional neural network (CNN), a deep neural network (DNN), a recurrent neural network (RNN), a restricted Boltzmann machine (RBM), a deep belief network (DBN), a bidirectional recurrent deep neural network (BRDNN), a deep Q-Network, and the like, but the artificial neural network is not limited to the above examples.

Figure 2:
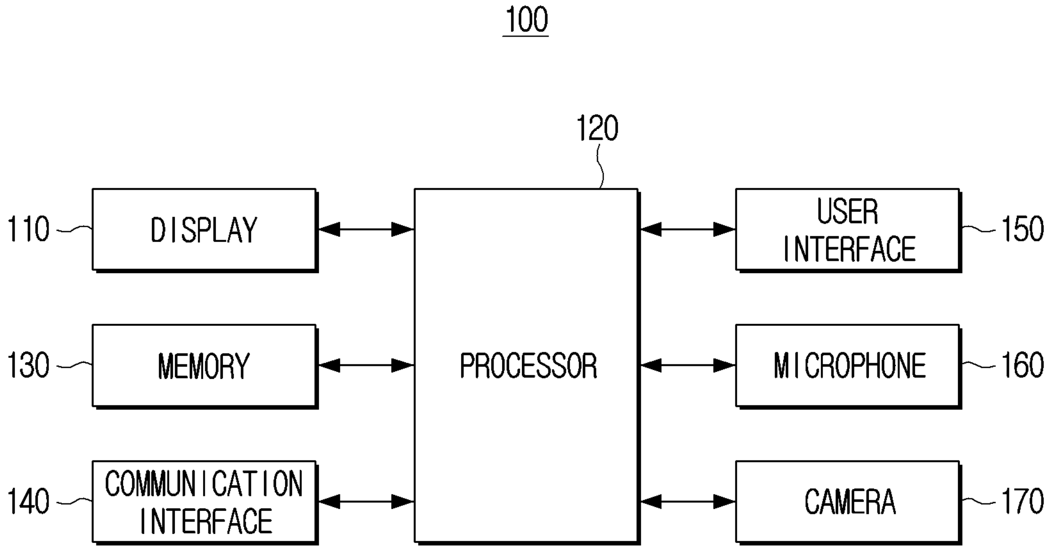
FIG. 2 is a block diagram illustrating a detailed configuration of the display device according to an embodiment of the present disclosure.

FIG. 2 is a block diagram illustrating a detailed configuration of the display device according to an embodiment of the present disclosure. The display device 100 may include the display 110 and the processor 120. In addition, referring to FIG. 2, the display device 100 may further include a memory 130, a communication interface 140, a user interface 150, a microphone 160, and a camera 170. Detailed description of components illustrated in FIG. 2 that overlaps with components illustrated in FIG. 1 will be omitted.

The memory 130 may refer to hardware storing information such as data in an electric or magnetic form so that the processor 120 may access the memory 120. To this end, the memory 130 may be implemented as at least one hardware of a non-volatile memory, a volatile memory, a flash memory, a hard disk drive (HDD), a solid state drive (SDD), a RAM, a ROM, or the like.

At least one instruction required for an operation of the display device 100 or the processor 120 may be stored in the memory 130. Here, the instruction is a code unit for instructing the operation of the display device 100 or the processor 120, and may be written in a machine language, which is a language that a computer may understand. Alternatively, a plurality of instructions that perform a specific task of the display device 100 or the processor 120 may be stored in the memory 130 as an instruction set.

The memory 130 may store data that is information in units of bits or bytes capable of representing characters, numbers, images, and the like. For example, the input image, etc., may be stored in the memory 130.

The memory 130 is accessed by the processor 120, and the instruction, the instruction set, or data may be read/written/modified/deleted/updated or the like by the processor 120.

The communication interface 140 is a component performing communication with various types of external apparatuses according to various types of communication manners. For example, the display device 100 may perform communication with a server or user terminal through the communication interface 140.

The communication interface 140 may include a wireless fidelity (WiFi) module, a Bluetooth module, an infrared communication module, a wireless communication module, and the like. Here, each communication module may be implemented in the form of at least one hardware chip.

The Wi-Fi module and the Bluetooth module perform communication in a Wi-Fi manner and a Bluetooth manner, respectively. When the Wi-Fi module or the Bluetooth module is used, various connection information such as a service set identifier (SSID), a session key, and the like, is first transmitted and received, communication is connected using the connection information, and various information may then be transmitted and received. The infrared communication module performs communication according to an infrared data association (IrDA) technology of wirelessly transmitting data to a short distance using an infrared ray positioned between a visible ray and a millimeter wave.

The wireless communication module may include at least one communication chip performing communication according to various wireless communication standards such as zigbee, $3^{rd}$ generation (3G), $3^{rd}$ generation partnership project (3GPP), long term evolution (LTE), LTE advanced (LTE-A), $4^{th}$ generation (4G), $5^{th}$ generation (5G), and the like, in addition to the communication manner described above.

Alternatively, the communication interface 140 may include a wired communication interface such as HDMI, DP, Thunderbolt, USB, RGB, D-SUB, and DVI.

In addition, the communication interface 140 may include a local area network (LAN) module, an Ethernet module, and at least one of wired communication modules performing communication using a pair cable, a coaxial cable, an optical fiber cable, or the like.

The user interface 150 may be implemented as a button, a touch pad, a mouse, a keyboard, etc., or may be implemented as a touch screen that may perform both of the display function and manipulation input function. Here, the button may be various types of buttons such as a mechanical button, a touch pad, a wheel, and the like, formed in any area such as a front surface portion, a side surface portion, a back surface portion, and the like, of a body appearance of the display device 100.

The microphone 160 is configured to receive sound and convert the sound into an audio signal. The microphone 160 is electrically connected to the processor 120 and may receive sound under the control of the processor 120.

For example, the microphone 160 may be formed integrally with an upper side, a front direction, a side direction, or the like, of the display device 100. Alternatively, the microphone 160 may be installed on a remote control separate from the display device 100. In this case, the remote control may receive sound through the microphone 160 and provide the received sound to the display device 100.

The microphone 160 may include various components such as a microphone collecting sound having an analog form, an amplifying circuit amplifying the collected sound, an A/D converting circuit sampling the amplified sound to convert the amplified user voice into a digital signal, a filter circuit removing a noise component from the converted digital signal, and the like.

Meanwhile, the microphone 160 may be implemented in the form of a sound sensor, and any configuration that may collect sound can be used.

In addition, the display device 100 may further include the camera 170. The camera 170 is a component for capturing a still image or a moving image. The camera 170 may capture a still image at a specific point in time, but may also continuously capture a still image.

The camera 170 may capture the front of the display device 100 to capture a user who is viewing the display device 100. The processor 120 may change the degree of pixel level reduction based on whether the user is identified from the image captured by the camera 170. For example, the processor 120 may reduce the pixel level more significantly when the user is not identified than when the user is identified from the image captured by the camera 170.

The camera 170 may include a lens, a shutter, an aperture, a solid state imaging device, an analog front end (AFE), and a timing generator (TG). The shutter controls the time for light reflected from the subject to enter the camera 170, and the aperture mechanically increases or decreases the size of the opening through which light enters to control the amount of light incident on the lens. When the solid state imaging device accumulates the light reflected from the subject as photocharges, it outputs an image by the photocharges as an electrical signal. The TG outputs a timing signal for reading out pixel data of the solid state imaging device, and the AFE samples and digitizes the electrical signal output from the solid state imaging device.

As described above, the display device 100 may identify the focus area and the background area in the input image, and perform the image processing on the focus area and the background area differently to increase the visual contrast ratio of the focus area, thereby lowering the pixel level of some areas to reduce the power consumption while preventing the image quality from deteriorating.

Hereinafter, the operation of the display device 100 will be described in more detail with reference to FIGS. 3 to 12. In FIGS. 3 to 12, individual embodiments are described for convenience of description. However, individual embodiments of FIGS. 3 to 12 may be implemented in any combination.

Figure 3:
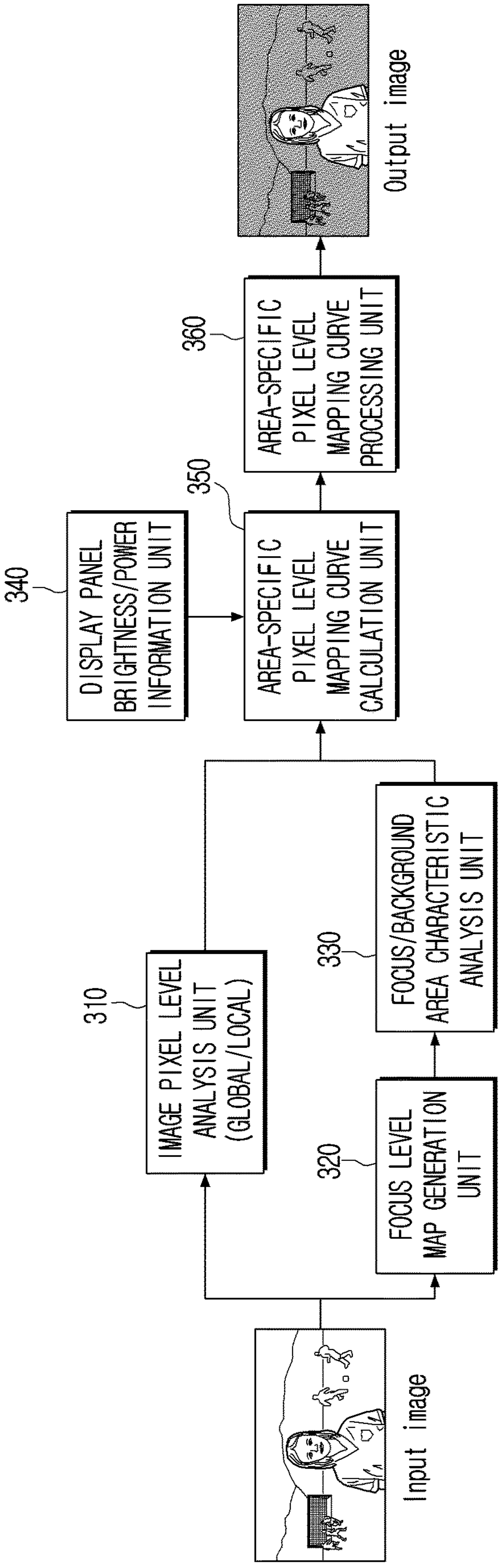
FIG. 3 is a diagram for describing in general an image processing operation according to an embodiment of the present disclosure.

FIG. 3 is a diagram for describing in general an image processing operation according to an embodiment of the present disclosure. In FIG. 3, the operation of the processor 120 is expressed as a plurality of blocks, and each of the plurality of blocks may be implemented as a hardware module. However, the plurality of blocks of FIG. 3 may be implemented as at least one processor 120. Hereinafter, the operation of the plurality of blocks or the operation of the processor 120 will be described interchangeably.

The display device 100 may increase the visual contrast ratio of a focus area of the input image while reducing the power consumption. For example, the display device 100 may obtain the tone mapping curves for each of the plurality of areas by combining pixel level information and focus level information obtained through the image analysis of the entire area (global) and a plurality of areas (local) of the input image with the panel pixel level and the power information, and perform the image processing on the input image based on the obtained tone mapping curve. Here, the display device 100 may apply the tone mapping curve that improves a linear curve or pixel level to the focus area, and applies the tone mapping curve that reduces the pixel level while minimizing the deterioration in image quality to the background area, thereby lowering the average pixel level (APL) (the average pixel level of the image is expressed as 0 to 100%) of the input image to lower the power consumption and increasing the contrast ratio of the focus area.

The display device 100 may include an image pixel level analysis unit 310, an focus level map generation unit 320, a focus/background area characteristic analysis unit 330, a display panel brightness/power information unit 340, a area-specific pixel level (tone) mapping curve calculation unit 350, and a area-specific pixel level mapping curve processing unit 360.

The image pixel level analysis unit 310 may obtain information of the average pixel level, the histogram, etc., of the entire area of the input image and each of the plurality of areas.

For example, the image pixel level analysis unit 310 may be implemented in a form divided into a global image analysis unit and a local image analysis unit. The global image analysis unit may convert an RGB signal of the input image into a YUV signal, and then obtain a histogram representing the number of pixels having the corresponding values for each code value for Y as GlobalHist[i]. Here, i represents the code value, and GlobalHist[i] represents the number of pixels. The Global image analysis unit may obtain the average pixel level information (GlobalAPL) of the entire input image using the histogram as follows.

$$GlobalAPL = \frac{1}{H \times W} \sum_{i=1}^{max} GlobalHist[i] \cdot i$$

Here, H denotes a vertical length of the input image, and W denotes a horizontal length. max denotes 8 bits as a maximum value of the code value. For example, max may be 256.

The local image analysis unit may divide the input image into a plurality of areas of M in width and N in height, and obtain the average pixel level for the area of m rows and n columns as LocalAPL_((m,n)) and the histogram as LocalHist[m][n][i]. The Local image analysis unit may obtain the average pixel level of each area (LocalAPL_((m,n))) by using the histogram of each area as follows.

$$LocalAPL_{(m,n)} = \frac{1}{BlockH \times BlockW} \sum_{i \in block(m,n)} LocalHist[m][n][i] \cdot i$$

Here, the Y signal utilized when obtaining the average pixel level of each area can utilize a signal in a linear domain or may be converted into a signal level that considers the gamma characteristic of the display 110 and utilized.

The information acquired through the image pixel level analysis unit 310 may be input to the area-specific pixel level mapping curve calculation unit 350 and used to acquire the tone mapping curve of each area.

The focus level map generation unit 320 may acquire the focus area map of the input image.

The focus/background area characteristic analysis unit 330 may analyze the focus area map acquired from the focus level map generation unit 320 to acquire the pixel levels and histogram distributions of the focus area and the background area.

The display panel brightness/power information unit 340 may include the power model and power-peak model information of the display 110.

The area-specific pixel level mapping curve calculation unit 350 may receive information from the image pixel level analysis unit 310, the focus/background area characteristic analysis unit 330, and the display panel brightness/power information unit 340, and obtain the tone mapping curve that increases the contrast ratio of the focus area while reducing the area-specific power consumption based on the received information.

The area-specific pixel level mapping curve processing unit 360 may perform image processing on the input image using the curves obtained by the area-specific pixel level mapping curve calculation unit 350.

The specific operation of each block will be described through the drawings described below.

Figure 4:
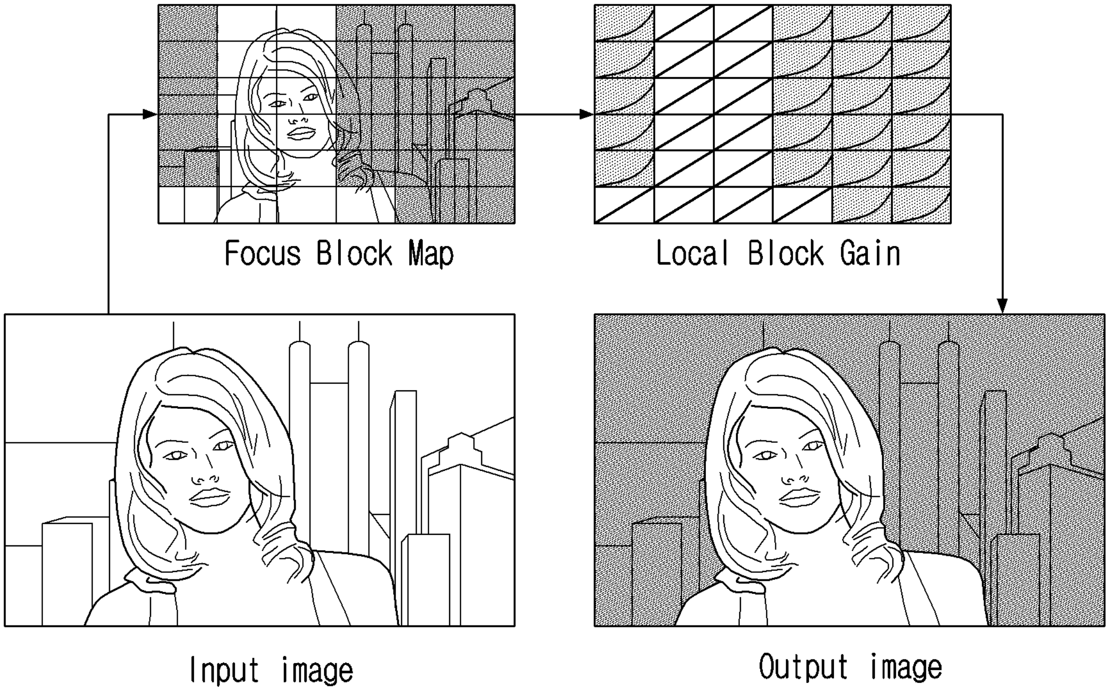
FIG. 4 and FIG. 5 are diagrams for describing the effect of differently processing a focus area and a background area according to an embodiment of the present disclosure.
Figure 5:
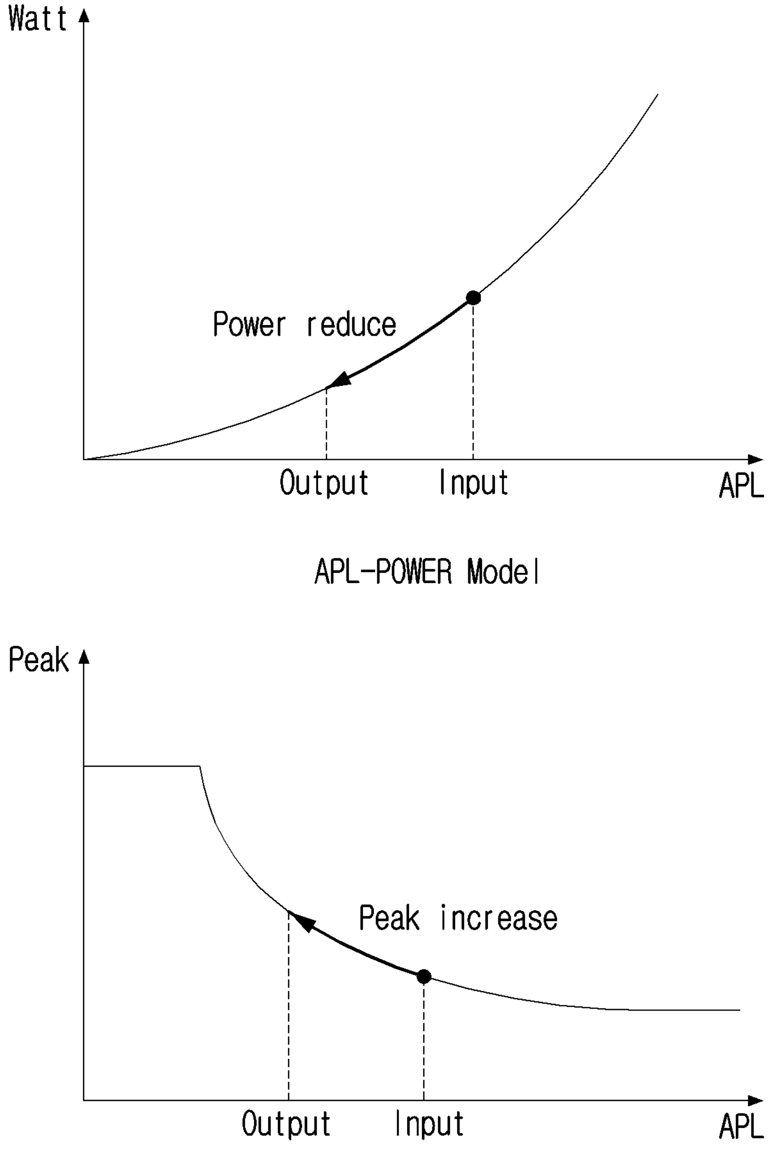

FIG. 4 and FIG. 5 are diagrams for describing the effect of differently processing a focus area and a background area according to an embodiment of the present disclosure.

As illustrated in FIG. 4, the processor 120 may identify the plurality of areas from the input image, and identify each of the plurality of areas as the focus area or the background area. For example, the processor 120 may obtain the focus area map overlaid on the input image, as illustrated in the upper left of FIG. 4. Here, the focus area map may include a focus area with high transparency and a background area with low transparency. Accordingly, when the focus area map is overlaid on the input image, the background area may be expressed as dark in the input image.

The processor 120 may obtain the tone mapping curves optimized for each of the plurality of areas based on the pixel level, the focus level, the peak luminance control (PLC) (display maximum output luminance adjustment) curve of the display 110 and the power information of each of the plurality of areas. For example, as illustrated in the upper right of FIG. 4, the processor 120 may apply the tone mapping curve of the linear curve to the focus area, and apply the tone mapping curve that reduces the pixel level to the background area.

In this case, as illustrated in the lower right of FIG. 4, the pixel level of the focus area is maintained, but the pixel level of the background area is lowered, so the pixel level contrast between the focus area and the background area may increase. In addition, as the average pixel level (APL) of the input image decreases, the power consumption may decrease, as illustrated in the upper side of FIG. 5. In addition, as the average pixel level (APL) of the input image decreases, the driving current increases, so the pixel level of the focus area may increase, as illustrated in the lower side of FIG. 5.

Figure 6:
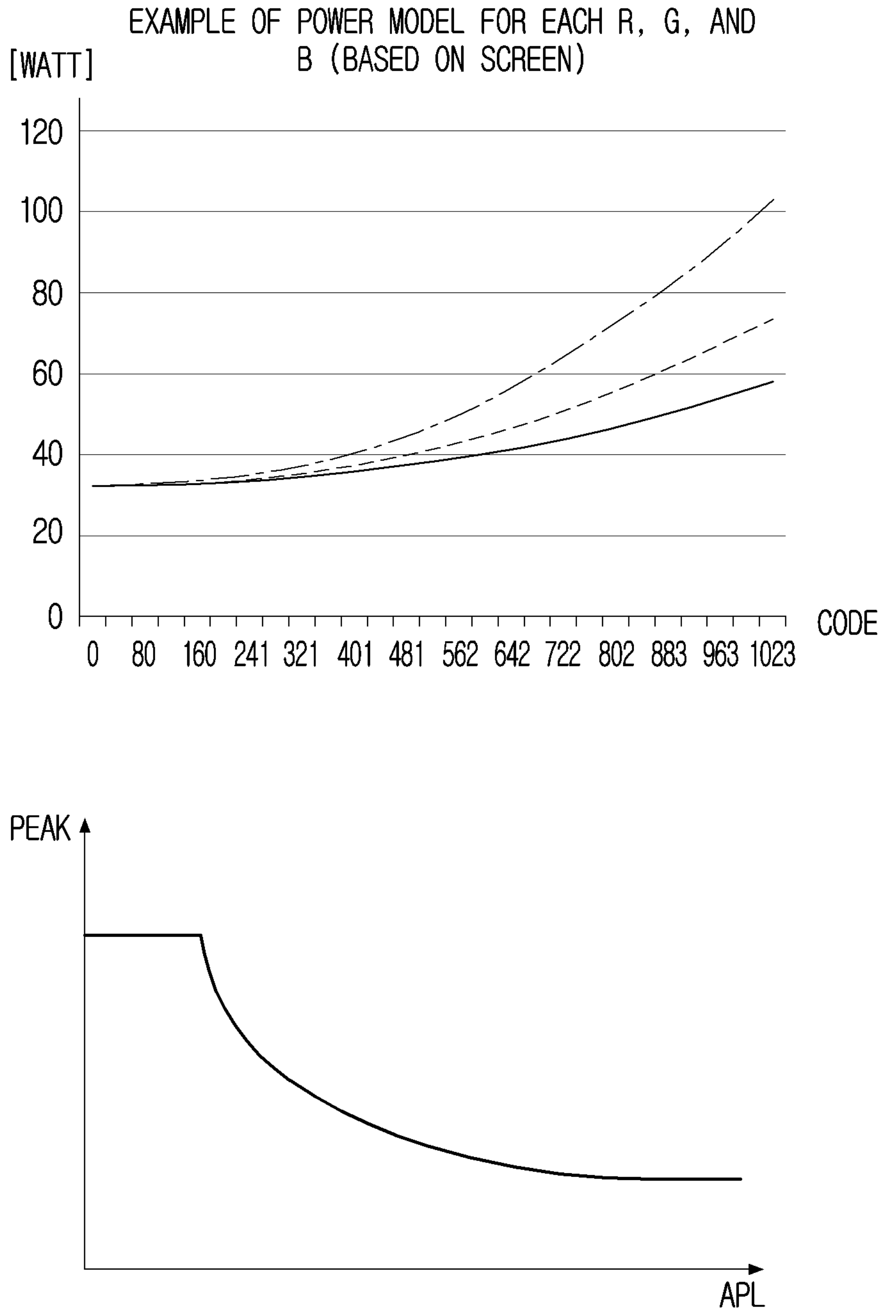
FIG. 6 is a diagram for describing information stored in a display panel brightness/power information unit according to an embodiment of the present disclosure.

FIG. 6 is a diagram for describing information stored in the display panel brightness/power information unit 340 according to an embodiment of the present disclosure.

The display panel brightness/power information unit 340 may include PLC information (APL-Peak model) that stores power consumption model information for each R, G, and B code of the input image and output current values according to the average pixel level (APL) of the input image.

For example, the power consumption model information may be expressed in a graph form such as the top of FIG. 6, in a LUT (Look-Up Table) form of power consumption values (watt) corresponding to R, G, and B code values, in a LUT form of the power consumption value corresponding to the average pixel level (APL) of the input image, etc. The PLC information may be expressed in a graph form such as the bottom of FIG. 6, in a LUT form of a current value or a peak (nit) value corresponding to the average pixel level (APL) of the input image, etc.

The power consumption model information and the PLC information may be used as the input information of the area-specific pixel level mapping curve calculation unit 350.

As an example, in the self-luminous display, when the average pixel level (APL) of the input image increases as in the PLC model at the bottom of FIG. 6 for power control, the driving unit driving the display 110 may reduce a current to lower the output pixel level of the display 110, thereby maintaining the power consumption at a certain level. On the other hand, when the average pixel level (APL) of the input image increases, the power consumption increases as in the power consumption model information at the top of FIG. 6.

The processor 120 may increase the current while reducing the power consumption by appropriately lowering the average pixel level (APL) from the average pixel level (APL) in the predetermined section, thereby increasing the output pixel level of the display 110. Here, the average pixel level (APL) in the predetermined section may be a predetermined section with a relatively steep slope at the bottom of FIG. 6.

Figure 7:
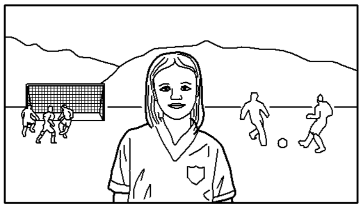
FIG. 7 is a diagram for describing a focus area map according to an embodiment of the present disclosure.
Figure 7:
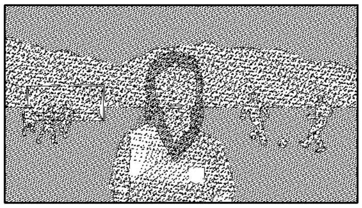
Figure 7:
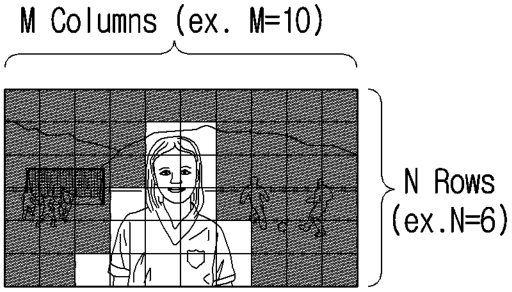

FIG. 7 is a diagram for describing the focus area map according to an embodiment of the present disclosure.

The focus level map generation unit 320 may extract the user's focus area in the input image and obtain a map (focus level map) having focus levels for each M×N area.

For example, the focus level map generation unit 320 can detect an edge area in the input image, or obtain a blur degree to obtain focus level values for each pixel. Alternatively, the focus level map generation unit 320 may obtain focus level values by utilizing saliency (areas that users are interested in within the input image) detection techniques. Alternatively, the focus level map generation unit 320 may obtain the focus level values based on a location where the user's gaze first stops by utilizing information from gaze tracking.

The focus level map generation unit 320 may obtain the focus level values in units of pixels of the input image, as in the middle of FIG. 7, in the above manner.

The focus level map generation unit 320 may obtain an area average value (FocusLevel[m][n]) of focus level values for M×N areas, and obtain an average (GlobalFocusLevel) of focus level values for the entire input image. For example, the focus level map generation unit 320 may display shading based on the area average value of the focus level values for 10×6 areas, as illustrated in the bottom of FIG. 7. In the bottom of FIG. 7, for convenience of description, the shading is shown in two stages, but there may be various stages of shading according to the area average value of the focus level value.

The area average value (FocusLevel[m][n]) of the focus level value may be input to the area-specific pixel level mapping curve calculation unit 350 and used to obtain the tone mapping curve of each area.

Meanwhile, the method for obtaining the area average value (FocusLevel[m][n]) of the focus level value in FIG. 7 is only an example, and other methods may be used. For example, the area average value (FocusLevel[m][n]) of the focus level value may be obtained by utilizing deep learning through a neural processing unit (NPU).

The focus/background area characteristic analysis unit 330 may identify each of the plurality of areas as the focus area or the background area based on the area average value (FocusLevel[m][n]) of the focus level value.

The focus/background area characteristic analysis unit 330 may also obtain an average pixel level (FocusObjectAPL) of the focus area, an average pixel level (BackgroundAPL) of the background area, a histogram (FocusHisto[i]) of the focus area, and a histogram (BackgroundHisto[i]) of the background area. In addition, the focus/background area characteristic analysis unit 330 may obtain a size (FocusObjectSize) of the focus area.

The information obtained from the focus/background area characteristic analysis unit 330 may be input to the area-specific pixel level mapping curve calculation unit 350 and used as an input for obtaining the tone mapping curve according to the relationship between the focus area and the background area.

Figure 8:
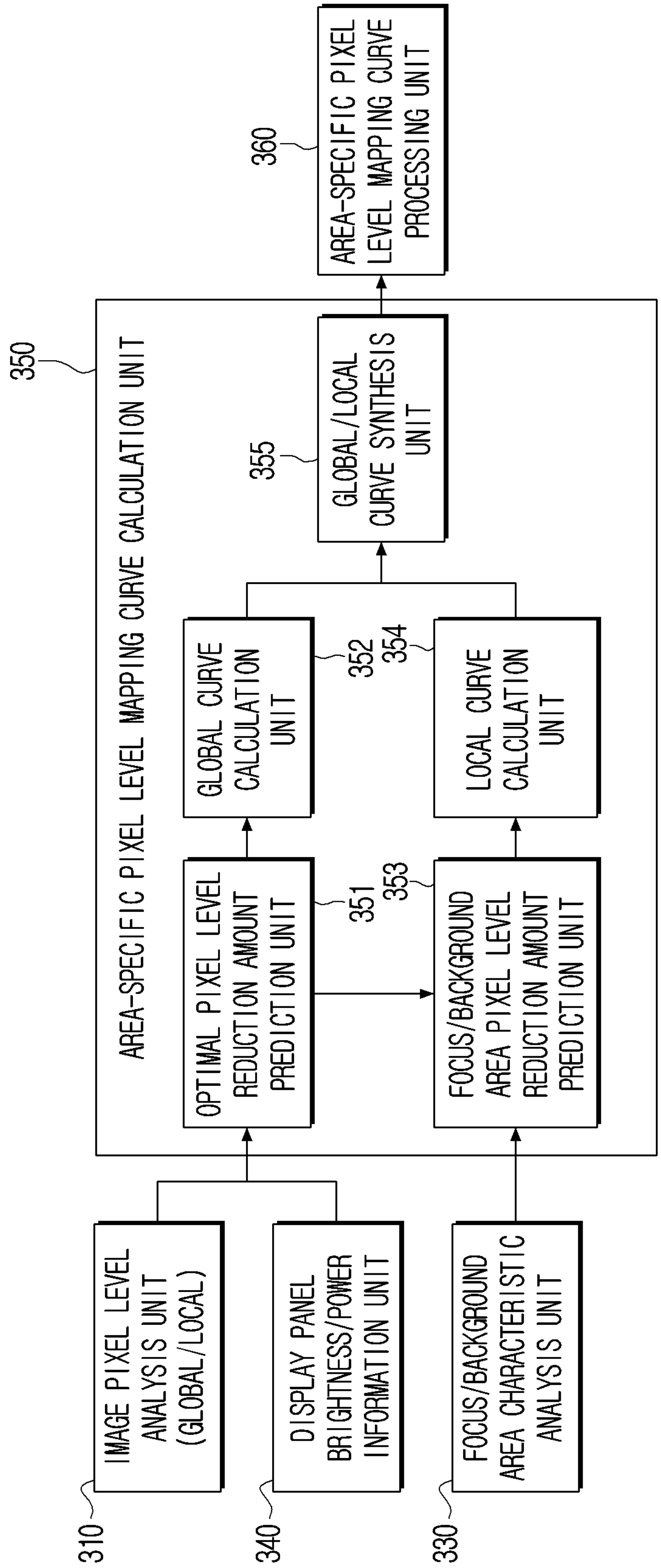
FIG. 8, FIG. 9, and FIG. 10 are diagrams for describing an operation of an area-specific pixel level mapping curve calculation unit according to an embodiment of the present disclosure.
Figure 9:
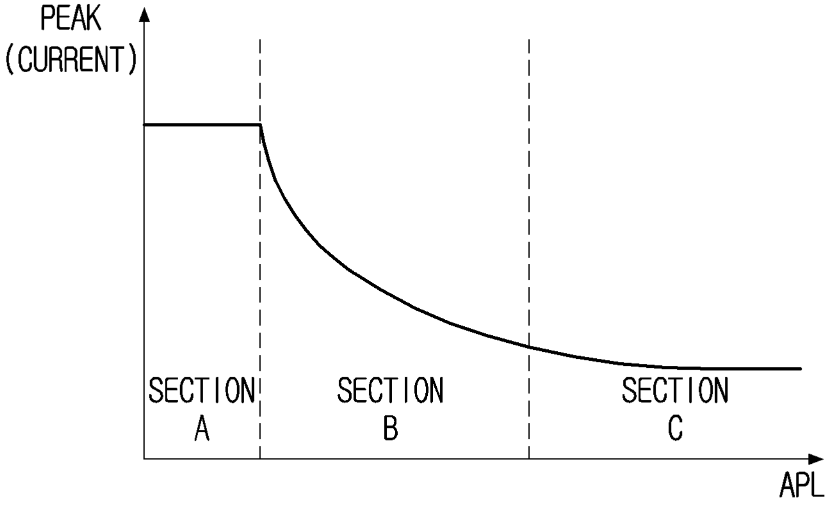
Figure 10:
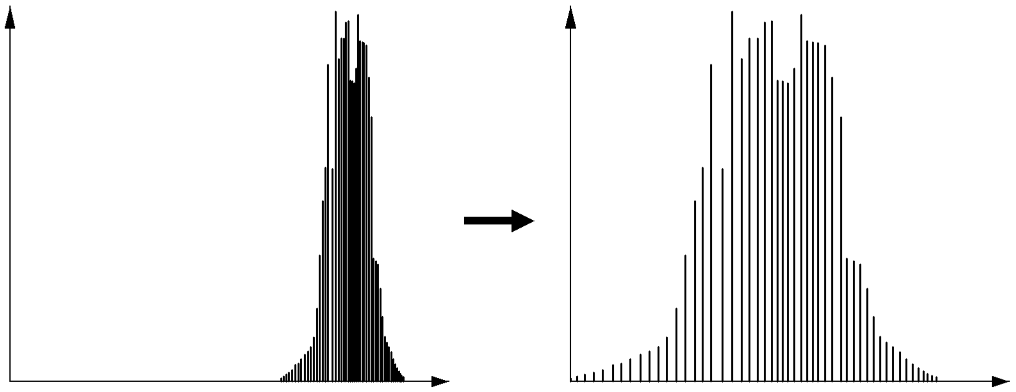
Figure 10:
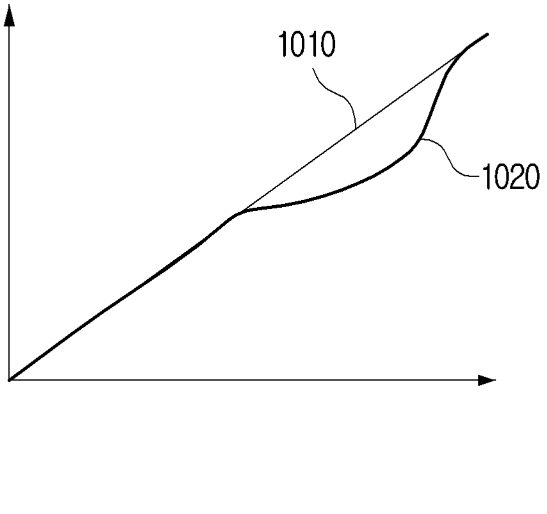

FIGS. 8 to 10 are diagrams for describing an operation of the area-specific pixel level mapping curve calculation unit 350 according to an embodiment of the present disclosure.

The area-specific pixel level mapping curve calculation unit 350 may include an optimal pixel level reduction amount prediction unit 351, a global curve calculation unit 352, a focus/background area pixel level reduction amount prediction unit 353, a local curve calculation unit 354, and a global/local curve synthesis unit 355.

The optimal pixel level reduction amount prediction unit 351 may obtain a pixel level reduction amount for optimizing the power consumption efficiency of the input image based on the pixel level information of the input image obtained from the image pixel level analysis unit 310 and the display panel brightness/power information unit 340 and the pixel level/power information unique to the display 110. Specifically, the optimal pixel level reduction amount prediction unit 351 may obtain an optimal pixel level reduction amount (AAPL_Power) for reducing the power consumption by analyzing the average pixel level of the input image and the PLC curve of the display 110.

In addition, as illustrated in FIG. 9, since a current value Peak is different according to the section of the average pixel level (APL) of the input image, the optimal pixel level reduction amount prediction unit 351 may operate differently according to the section of the average pixel level (APL) of the input image.

For example, since the current value Peak does not change even if the average pixel level (APL) decreases in section A, the optimal pixel level reduction amount prediction unit 351 may obtain the pixel level reduction amount according to the targeted power consumption reduction amount. Since the current value Peak increases as the average pixel level (APL) decreases in sections B and C, the power may increase. That is, the optimal pixel level reduction amount prediction unit 351 may obtain the pixel level reduction amount by considering additional pixel level reduction in sections B and C to achieve the targeted power consumption reduction amount.

The global curve calculation unit 352 may receive the pixel level reduction amount and obtain the tone mapping curve that reflects the characteristics of the entire input image based on the pixel level reduction amount. For example, the Global curve calculation unit 352 may obtain the global tone mapping curve of the input image through an optimization equation as follows based on pixel level information such as GlobalHist[i] and GlobalAPL obtained from the image pixel level analysis unit 310, GlobalFocusLevel information obtained from the focus level map generation unit 320, and pixel level reduction amount according to pixel level/power information of the display 110 obtained from the optimal pixel level reduction amount prediction unit 351.

$$t^*_{global} = \arg\min_t\left\{\|r - t\|^2 + \alpha \cdot \mathrm{Power}(t, I) + \beta \cdot FocusLocal(t, I)\right\}$$

Here, the left side denotes the optimized global tone mapping curve, and r denotes an optimized reference curve through the pixel level information analysis such as the average pixel level and histogram of the input image. Power(t,I) is a term that optimizes power efficiency through the pixel level/power information of the display 110 according to the average pixel level of the input image I, and may adjust the influence on the final tone mapping curve determination according to a weight α. Focus(t,I) is a term that adjusts the tone mapping curve according to the focus level of the image, and may adjust the influence by adjusting β. Here, α and β may be obtained from the system through the optimization equation, or obtained through the user's input. In this case, the tone mapping curve may be expressed in the form of the mapping curve, the equation, the LUT, etc., of the output code value according to the input (which can be processed as Y or R, G, B according to the mode) code value.

However, this is only one embodiment, and the global curve calculation unit 352 may obtain the tone mapping curve in any other way. In addition, the global curve calculation unit 352 may obtain the global tone mapping curve based on the power consumption reduction amount and the histogram of the input image. For example, the global curve calculation unit 352 may reduce the pixel level as illustrated in the upper right of FIG. 10 when the input image is expressed as the histogram as illustrated in the upper left of FIG. 10. In this case, the tone mapping curve may be a linear curve 1010 for low grayscale, and a curve 1020 for lowering the pixel level may be used for high grayscale, as illustrated in the bottom of FIG. 10.

The focus/background area pixel level reduction amount prediction unit 353 may obtain an optimal pixel level reduction amount for each of the plurality of areas based on the average pixel level and histogram of each of the focus area and background area obtained from the focus/background area characteristic analysis unit 330 and the pixel level reduction amount obtained from the optimal pixel level reduction amount prediction unit 351.

Specifically, the focus/background area pixel level reduction amount prediction unit 353 may obtain an optimal pixel level reduction amount (ABLK_APL_Power(m,n)) of each of the plurality of areas based on the information on which section of the PLC information the average pixel level of the input image obtained from the optimal pixel level reduction amount prediction unit 351 is in, the AAPL_Power information, and the FocusObjectAPL, BackgroundAPL, FocusHisto[i], and BackgroundHisto[i] obtained from the focus/background area characteristic analysis unit 330. Here, the focus/background area pixel level reduction amount prediction unit 353 may obtain the optimal pixel level reduction amount (ABLK_APL_Power(m,n)) of each of the plurality of areas based on the characteristics of the input image.

For example, the focus/background area pixel level reduction amount prediction unit 353 may obtain the optimal pixel level reduction amount (ABLK_APL_Power(m,n)) of each of the plurality of areas based on the pixel level of the focus area and the pixel level of the background area. For example, when the FocusObjectAPL is greater than or equal to than the BackgroundAPL, that is, when the pixel level of the focus area is similar to or brighter than the pixel level of the background area, the focus/background area pixel level reduction amount prediction unit 353 may apply a strong gain to the pixel level reduction amount of the background area to increase the pixel level difference between the focus area and the background area. In this case, the object-centered contrast ratio can be improved by increasing the contrast difference between the focus area and the background area along with the power consumption gain through the reduction in the average pixel level. Alternatively, when the FocusObjectAPL is less than the BackgroundAPL, that is, when the pixel level of the focus area is brighter than the pixel level of the background area, simply strongly lowering the pixel level of the background area may reduce the power consumption, but decrease the contrast difference between the focus area and the background area to decrease the contrast ratio. To prevent this, the focus/background area pixel level reduction amount prediction unit 353 does not consider the pixel level of the focus area/background area, but may utilize the respective grayscale distribution information, FocusHisto[i] and BackgroundHisto[i], to reduce the pixel level only for the area with similar grayscale to the focus area among the grayscales of the background area, not to reduce the pixel level of other bright areas, or reduce the reduction amount.

Alternatively, the focus/background area pixel level reduction amount prediction unit 353 may obtain the optimal pixel level reduction amount (ABLK_APL_Power(m,n)) of each of the plurality of areas based on the APL-peak model.

For example, section A of FIG. 9 is a section where there is no change in current due to the decrease in the average pixel level of the input image, and the focus/background area pixel level reduction amount prediction unit 353 may reduce the pixel level in the background area by AAPL_Power when only the power consumption reduction effect is desired. Alternatively, the focus/background area pixel level reduction amount prediction unit 353 may increase the reduction amount in the background area by the APL increase amount of the focus area in order to secure the power consumption reduction effect while improving the pixel level of the focus area.

Alternatively, section B of FIG. 9 is a section where the current increases and the power consumption effect is small even if the average pixel level of the input image decreases, and the focus/background area pixel level reduction amount prediction unit 353 may reduce the pixel level only in the background area by AAPL_Power. In this case, the power consumption reduction effect is small, but the pixel level of the focus area may increase as the current increases. Alternatively, the focus/background area pixel level reduction amount prediction unit 353 may lower the pixel level of the background area while lowering the pixel level of the focus area to the corresponding degree in consideration of increasing the pixel level of the focus area while lowering the pixel level of the background area by AAPL_Power. In this case, the power consumption may be lowered more strongly while maintaining the pixel level of the focus area.

Alternatively, section C of FIG. 9 is a section in which there is no current change due to the decrease in the average pixel level unless section B is entered due to the decrease in the average pixel level of the input image. In this case, the focus/background area pixel level reduction amount prediction unit 353 may reduce only the pixel level of the background area like section A, but maintain the amount of decrease in the average pixel level at a level that does not pass over to section B. The focus/background area pixel level reduction amount prediction unit 353 may operate like section B above when passing over to section B.

Alternatively, the focus/background area pixel level reduction amount prediction unit 353 may obtain the optimal pixel level reduction amount (ABLK_APL_Power(m,n)) of each of the plurality of areas based on the size of the focus area.

For example, the focus/background area pixel level reduction amount prediction unit 353 may reduce the pixel level of the entire image by AAPL_Power by referring to the APL-peak model when the size of the focus area is small or is not present (FocusObjectSize<Threshold). In this case, the focus/background area pixel level reduction amount prediction unit 353 may primarily lower the grayscale (mid-low grayscale) where the pixel level reduction is less perceptually felt, and maintain the peak pixel level. Alternatively, the focus/background area pixel level reduction amount prediction unit 353 may not perform the pixel level reduction when the size of the focus area is small or is not present.

Alternatively, in the case of a complex image where the input image has many focus areas and thus the focus area may not be specified, the focus/background area pixel level reduction amount prediction part 353 may reduce the pixel level of the entire image by AAPL_Power by referring to the APL-Peak model. Alternatively, since the focus is highly likely to be at the center of the screen in the case of the complex image, the focus/background area pixel level reduction amount prediction unit 353 may maintain the pixel level in the center area of the image and increase the pixel level reduction amount as it goes toward the edge area of the image.

The local curve calculation unit 354 may receive the optimal pixel level reduction amount for each of the plurality of areas, and obtain the tone mapping curve reflecting the characteristics of each of the plurality of areas based on the optimal pixel level reduction amount for each of the plurality of areas.

For example, the local curve calculation unit 354 may obtain the local tone mapping curves for each of the plurality of areas through the following equation based on pixel level related information such as LocalAPL_((m,n)), LocalHist [m][n][i] of the plurality of areas obtained from the image pixel level analysis unit 310, FocusLevel[m][n] and FocusObjectSize obtained from the focus level map generation unit 320, and ABLK_APL_Power(m,n) obtained from the focus/background area pixel level reduction amount prediction unit 353. Here, the tone mapping curve may be expressed in the form of the mapping curve, the formula, the LUT, etc., of the output code value according to the input (which can be processed as Y or R, G, B according to the mode) code value.

$$t^{*}_{local(m,n)} = \arg\min_{t}\{\|r_{(m,n)} - t\|^2 + \gamma \cdot \mathrm{Power}(t, I) + \delta \cdot FocusLocal(t, I)\}$$

Here, the left side denotes an optimized local tone mapping curve for an area corresponding to m row and n column positions, and r(m.n) denotes a reference curve optimized through analysis of pixel level information such as an average pixel level and histogram of an area at an (m,n) position. Power(t,I) is a term for obtaining the local tone mapping curve that optimizes the power gain and peak enhancement effect, and its influence may be adjusted according to a weight γ. Focus(t,I) is a term that may improve the pixel level contrast between the focus area and the background area in consideration of the focus level information for each area and a difference between an average pixel level between areas (focus area estimation area) with high focus levels and an average pixel level between other background areas, and its influence may be adjusted through δ. Here, γ and δ may be obtained from the system through the optimization equation, or obtained through the user's input.

The global/local curve synthesis unit 355 may synthesize the tone mapping curve that reflects the characteristics of the entire input image and the tone mapping curve that reflects the characteristics of each of plurality of areas.

For example, the global/local curve synthesis unit 355 may weight-sum the global tone mapping curve and the local tone mapping curves corresponding to each of the plurality of areas, serially synthesize the global tone mapping curve and the local tone mapping curves corresponding to each of the plurality of areas, or serially synthesize the local tone mapping curve and the global tone mapping curve corresponding to each of the plurality of areas.

Meanwhile, the area-specific pixel level mapping curve processing unit 360 mentioned in FIG. 3 may perform the image processing on each actual pixel based on the tone mapping curve of each of the plurality of areas. For example, when the input image is divided into 10×6, the tone mapping curves for each of 60 areas may be generated. In this case, when a different curve is applied to each of the 60 areas, the pixel level difference may occur at the boundary. Accordingly, the area-specific pixel level mapping curve processing unit 360 may interpolate the tone mapping curve between adjacent areas by assigning a weight value according to the distance between the areas and apply the interpolated tone mapping curve to the pixel. In this case, it is possible to prevent the image quality from deteriorating at the boundary.

Figure 11:
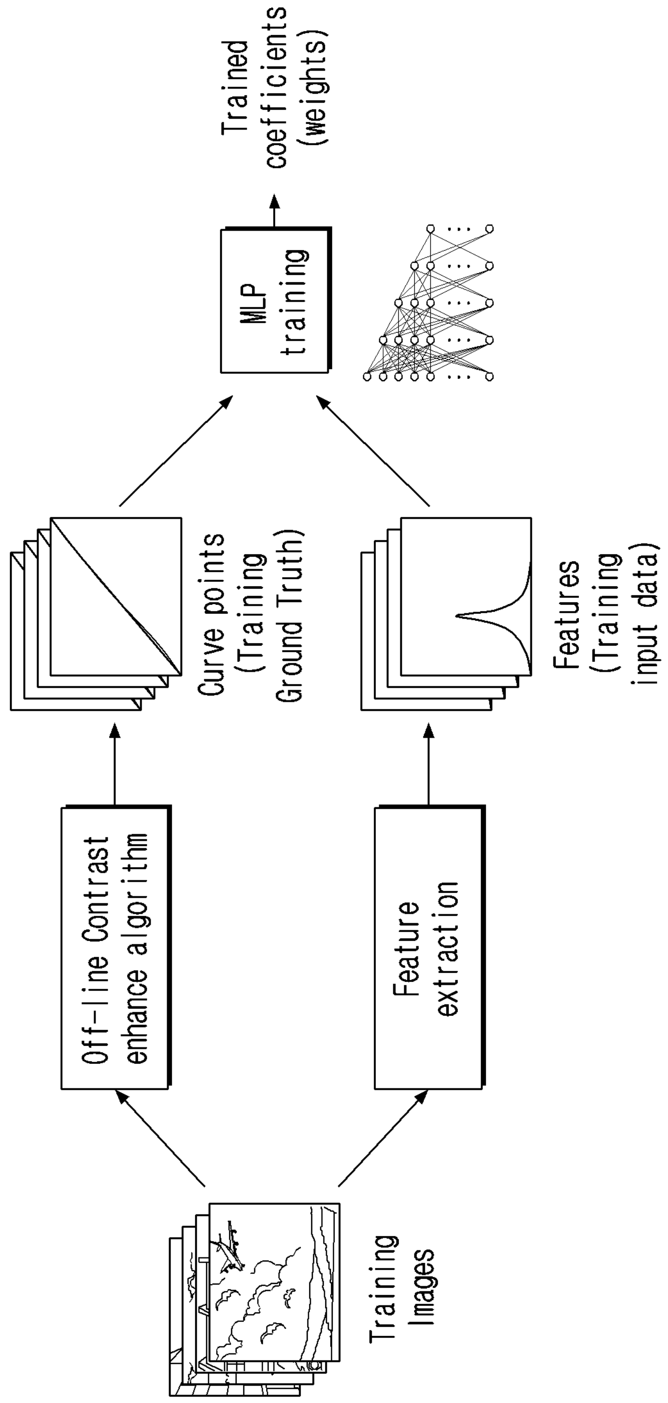
FIG. 11 and FIG. 12 are diagrams for describing an embodiment of using another artificial intelligence model according to an embodiment of the present disclosure.
Figure 12:
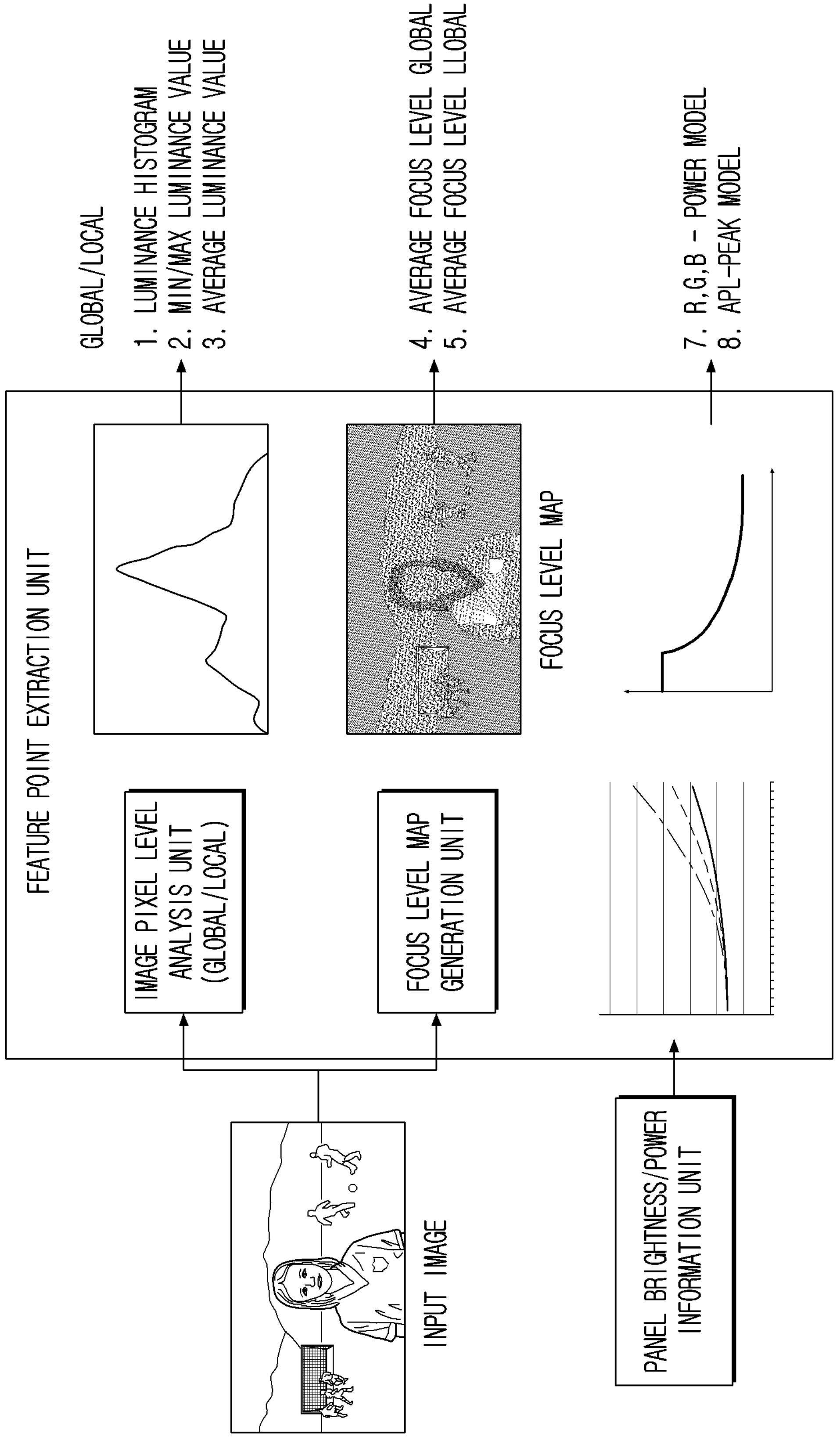

FIGS. 11 and 12 are diagrams for describing an embodiment of using another artificial intelligence model according to an embodiment of the present disclosure.

The processor 120 may process the image using the method up to FIG. 10, but may also acquire the optimal tone mapping curve using the learning method utilizing deep learning.

For example, as illustrated in FIG. 11, by using a multilayer perception (MLP) method, etc., targeting a set of training images, the feature information extracted from the image is trained as input and the output (training ground truth) is trained with the optimal tone mapping curve obtained by the method up to FIG. 10 as an output to obtain the training coefficient, thereby using the off-line algorithm in the changeable structure. In addition, as illustrated in FIG. 12, the feature extraction is possible when implemented with the learning method using deep learning.

Figure 13:
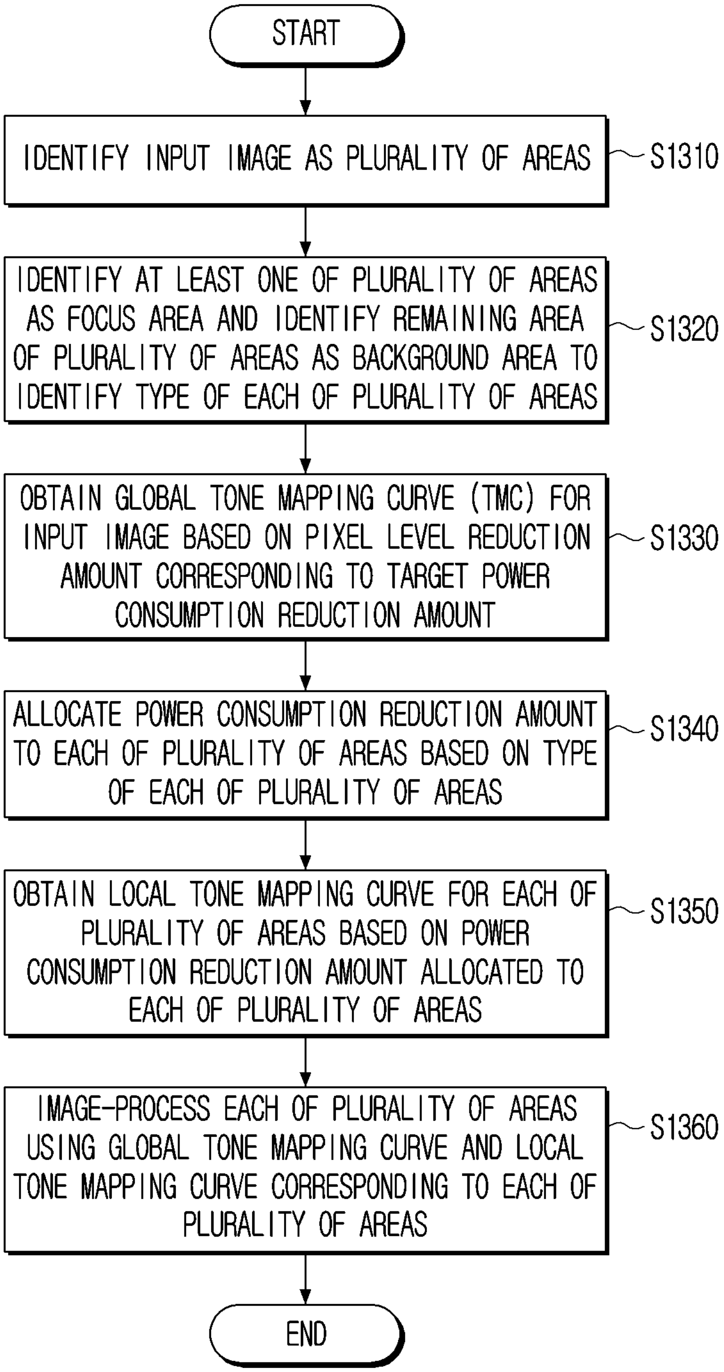
FIG. 13 is a flow chart for describing a method for controlling a display device according to an embodiment of the present disclosure.

FIG. 13 is a flow chart for describing a method for controlling a display device according to an exemplary embodiment of the present disclosure.

First, the input image is identified as the plurality of areas (S1310). At least one of the plurality of areas is identified as the focus area and the remaining areas among the plurality of areas are identified as the background area, thereby identifying the type of each of the plurality of areas (S1320). The global tone mapping curve (TMC) for the input image is acquired based on the pixel level reduction amount corresponding to the target power consumption reduction amount (S1330). The power consumption reduction amount is allocated to each of the plurality of areas based on the type of each of the plurality of areas (S1340). The local tone mapping curves for each of the plurality of areas are obtained based on the power consumption reduction amount allocated to each of the plurality of areas (S1350). Each of the plurality of areas is image-processed using the global tone mapping curve and the local tone mapping curve corresponding to each of the plurality of areas (S1360).

Here, in the allocating (S1340), when the average pixel level of the focus area is greater than or equal to that the background area, the larger power consumption reduction amount may be allocated to the area identified as the background area among the plurality of areas than the area identified as the focus area among the plurality of areas.

Alternatively, in the allocating (S1340), when the average pixel level of the focus area is less than that of the background area, a pixel level of the grayscale values in the predetermined range among the background areas may be reduced and the pixel level of the remaining grayscale values among the background area may not be reduced or the reduction amount of the pixel level of the remaining grayscale values may be reduced, based on the grayscale information of the focus area.

Alternatively, in the allocating (S1340), when the average pixel level of the input image is less than a predetermined first value and greater than or equal to a predetermined second value greater than the predetermined first value, the power consumption reduction amount may be allocated only to the area identified as the background area among the plurality of areas, and when the average pixel level of the input image is greater than or equal to the predetermined first value and less than the predetermined second value, the power consumption reduction amount may be allocated to each of the plurality of areas.

Alternatively, when the size of the focus area is less than the predetermined size, the processor 120 may allocate the larger power consumption reduction amount to the area in which the average pixel level of each of the plurality of areas is less than a threshold value than the area in which the average pixel level of each of the plurality of areas is greater than or equal to a threshold value.

Alternatively, in the allocating (S1340), when the focus area includes the plurality of areas spaced apart from each other, the power consumption reduction amount may be allocated to each of the plurality of areas based on the relative positions of the focus area in the input image.

Alternatively, in the allocating (S1340), the power consumption reduction amount may be allocated to each of the plurality of areas based on the type of each of the plurality of areas and the histogram information of each of the plurality of areas.

Meanwhile, in the obtaining of the global tone mapping curve (S1330), the global tone mapping curve may be obtained based on the target power consumption reduction amount and the histogram of the input image.

In the identifying of the type of each of the plurality of areas (S1320), the type of each of the plurality of areas may be identified based on at least one of the edge included in the input image, the degree of blur of the input image, the saliency detection technique, or the user's gaze tracking.

Meanwhile, in the performing of the image processing (S1360), each of the plurality of areas may be image-processed using one of a method for weighting the global tone mapping curves and local tone mapping curves corresponding to each of the plurality of areas, a method for serially synthesizing the global tone mapping curves and local tone mapping curves corresponding to each of the plurality of areas, and a method for serially synthesizing the local tone mapping curves and the global tone mapping curves corresponding to each of the plurality of areas.

According to various embodiments of the present disclosure as described above, the display device may reduce the power consumption in the process of displaying the input image by lowering the average pixel level of at least some areas.

In addition, the display device may identify the focus area and the background area in the input image, and perform image processing on the focus area and the background area differently to increase the visual contrast ratio of the focus area, thereby preventing the image quality from deteriorating.

Meanwhile, according to an embodiment of the disclosure, the diverse embodiments described above may be implemented as software including instructions stored in a machine-readable storage medium (e.g., a computer-readable storage medium). A machine may be a device that invokes the stored instruction from the storage medium and may be operated according to the invoked instruction, and may include the electronic device (e.g., the electronic device A) according to the disclosed embodiments. When a command is executed by the processor, the processor may directly perform a function corresponding to the command or other components may perform the function corresponding to the command under a control of the processor. The command may include codes created or executed by a compiler or an interpreter. The machine-readable storage medium may be provided in a form of a non-transitory storage medium. Here, the term 'non-transitory' means that the storage medium is tangible without including a signal, and does not distinguish whether data are semi-permanently or temporarily stored in the storage medium.

In addition, according to an embodiment of the disclosure, the methods according to the diverse embodiments described above may be included and provided in a computer program product. The computer program product may be traded as a product between a seller and a purchaser. The computer program product may be distributed in the form of a storage medium (e.g., a compact disc read only memory (CD-ROM)) that may be read by the machine or online through an application store (e.g., PlayStore™). In a case of the online distribution, at least portions of the computer program product may be at least temporarily stored in a storage medium such as a memory of a server of a manufacturer, a server of an application store, or a relay server or be temporarily created.

In addition, according to an embodiment of the disclosure, the diverse embodiments described above may be implemented in a computer or a computer-readable recording medium using software, hardware, or a combination of software and hardware. In some cases, embodiments described in the disclosure may be implemented as a processor itself. According to a software implementation, embodiments such as procedures and functions described in the specification may be implemented as separate software. Each software may perform one or more functions and operations described in the disclosure.

Meanwhile, computer instructions for performing processing operations of the machines according to the diverse embodiment of the disclosure described above may be stored in a non-transitory computer-readable medium. The computer instructions stored in the non-transitory computer-readable medium allow a specific machine to perform the processing operations in the machine according to the diverse embodiments described above when they are executed by a processor of the specific machine. The non-transitory computer-readable medium is not a medium that stores data for a while, such as a register, a cache, a memory, or the like, but means a medium that semi-permanently stores data and is readable by the device. Specific examples of the non-transitory computer-readable medium may include a compact disk (CD), a digital versatile disk (DVD), a hard disk, a Blu-ray disk, a USB, a memory card, a read only memory (ROM), and the like.

In addition, each of components (e.g., modules or programs) according to the diverse embodiments described above may include a single entity or a plurality of entities, and some of the corresponding sub-components described above may be omitted or other sub-components may be further included in the diverse embodiments. Alternatively or additionally, some of the components (e.g., the modules or the programs) may be integrated into one entity, and may perform functions performed by the respective corresponding components before being integrated in the same or similar manner. Operations performed by the modules, the programs, or the other components according to the diverse embodiments may be executed in a sequential manner, a parallel manner, an iterative manner, or a heuristic manner, at least some of the operations may be performed in a different order or be omitted, or other operations may be added.

Although embodiments of the disclosure have been illustrated and described hereinabove, the disclosure is not limited to the abovementioned specific embodiments, but may be variously modified by those skilled in the art to which the disclosure pertains without departing from the gist of the disclosure as disclosed in the accompanying claims. These modifications should also be understood to fall within the scope and spirit of the disclosure.

What is claimed is:

1. A display device, comprising:

a display; and at least one processor connected to the display and configured to control the display device, wherein the at least one processor is configured to:

identify an input image as a plurality of areas, identify a type of each of the plurality of areas by identifying at least one of the plurality of areas as a focus area and by identifying other areas of the plurality of areas as a background area, obtain a global tone mapping curve for the input image based on a pixel level reduction amount corresponding to a target power consumption reduction amount, allocate a power consumption reduction amount to each of the plurality of areas based on the type of each of the plurality of areas, obtain a local tone mapping curve for each of the plurality of areas based on the power consumption reduction amount allocated to each of the plurality of areas, and perform image processing on each of the plurality of areas using the global tone mapping curve and the local tone mapping curve such that image processing performed on the plurality of areas identified as the focus area is different from image processing performed on the plurality of areas identified as the background area.

2. The display device as claimed in claim 1, wherein the at least one processor is further configured to:

based on an average pixel level of the focus area being greater than or equal to an average pixel level of the background area, allocate a larger power consumption reduction amount to the background area among the plurality of areas than the focus area among the plurality of areas.

3. The display device as claimed in claim 1, wherein the at least one processor is further configured to:

based on an average pixel level of the focus area being less than an average pixel level of the background area, reduce a pixel level of at least one area among the background area corresponding to a grayscale value in a predetermined range, and not reduce a pixel level of other areas among the background area or reduce a reduction amount of the pixel level of the other areas, based on grayscale information of the focus area.

4. The display device as claimed in claim 1, wherein the at least one processor is further configured to:

based on an average pixel level of the input image being less than a predetermined first value and greater than or equal to a predetermined second value greater than the predetermined first value, allocate the power consumption reduction amount only to the background area among the plurality of areas, and based on the average pixel level of the input image being greater than or equal to the predetermined first value and less than the predetermined second value, allocate the power consumption reduction amount to each of the plurality of areas.

5. The display device as claimed in claim 1, wherein the at least one processor is further configured to:

based on a size of the focus area being less than a predetermined size, allocate a larger power consumption reduction amount to an area corresponding to an average pixel level that is less than a threshold value, than an area corresponding to an average pixel level that is greater than or equal to the threshold value.

6. The display device as claimed in claim 1, wherein the at least one processor is further configured to:

based on the plurality of areas included in the focus area being spaced apart from each other, allocate the power consumption reduction amount to each of the plurality of areas based on a relative position of the focus area in the input image.

7. The display device as claimed in claim 1, wherein the at least one processor is further configured to allocate the power consumption reduction amount to each of the plurality of areas based on the type of each of the plurality of areas and histogram information of each of the plurality of areas.

8. The display device as claimed in claim 1, wherein the at least one processor is further configured to obtain the global tone mapping curve based on the target power consumption reduction amount and a histogram of the input image.

9. The display device as claimed in claim 1, wherein the at least one processor is further configured to identify the type of each of the plurality of areas based on at least one of:

an edge included in the input image, a degree of blur of the input image, a saliency detection technique, or a gaze tracking of a user.

10. The display device as claimed in claim 1, wherein the at least one processor is further configured to perform image processing on each of the plurality of areas using one of:

a method for weighting the global tone mapping curve and the local tone mapping curve corresponding to each of the plurality of areas, a method for serially synthesizing the global tone mapping curve and the local tone mapping curve corresponding to each of the plurality of areas, or a method for serially synthesizing the global tone mapping curve and the local tone mapping curve corresponding to each of the plurality of areas.

11. A method for controlling a display device, comprising: identifying an input image as a plurality of areas;

identifying a type of each of the plurality of areas by identifying at least one of the plurality of areas as a focus area and by identifying other areas among the plurality of areas as a background area;

obtaining a global tone mapping curve for the input image based on a pixel level reduction amount corresponding to a target power consumption reduction amount;

allocating a power consumption reduction amount to each of the plurality of areas based on the type of each of the plurality of areas;

obtaining a local tone mapping curve for each of the plurality of areas based on the power consumption reduction amount allocated to each of the plurality of areas; and performing image processing on each of the plurality of areas using the global tone mapping curve and the local tone mapping curve such that image processing performed on the plurality of areas identified as the focus area is different from image processing performed on the plurality of areas identified as the background area.

12. The method as claimed in claim 11, wherein the allocating the power consumption reduction amount comprises:

based on an average pixel level of the focus area being greater than or equal to an average pixel level of the background area, allocating a larger power consumption reduction amount to the background area among the plurality of areas than the focus area among the plurality of areas.

13. The method as claimed in claim 11, wherein the allocating the power consumption reduction amount comprises:

based on an average pixel level of the focus area being less than an average pixel level of the background area, according to grayscale information of the focus area, reduce a pixel level of at least one area among the background area corresponding to a grayscale value in a predetermined range, and not reduce a pixel level of other areas among the background area or reduce a reduction amount of the pixel level of the other areas among the background area.

14. The method as claimed in claim 11, wherein the allocating the power consumption reduction amount comprises:

based on an average pixel level of the input image being less than a predetermined first value or greater than or equal to a predetermined second value greater than the predetermined first value, allocating the power consumption reduction amount only to the background area among the plurality of areas, and based on the average pixel level of the input image being greater than or equal to the predetermined first value and less than the predetermined second value, allocating the power consumption reduction amount to each of the plurality of areas.

15. The method as claimed in claim 11, wherein the allocating the power consumption reduction amount comprises:

based on a size of the focus area being less than a predetermined size, a larger power consumption reduction amount is allocated to an area corresponding to average pixel level that is less than a threshold value than an area corresponding to an average pixel level that is greater than or equal to the threshold value.

* * * * *